US010502394B2

(12) United States Patent
Yoshida

(10) Patent No.: US 10,502,394 B2
(45) Date of Patent: Dec. 10, 2019

(54) DISPLAY DEVICE AND METHOD FOR MANUFACTURING DISPLAY BOARD

(71) Applicant: KABUSHIKI KAISHA TOKAI RIKA DENKI SEISAKUSHO, Aichi (JP)

(72) Inventor: Hiroshi Yoshida, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 0 days.

(21) Appl. No.: 16/089,018

(22) PCT Filed: Mar. 31, 2017

(86) PCT No.: PCT/JP2017/013656
§ 371 (c)(1),
(2) Date: Sep. 27, 2018

(87) PCT Pub. No.: WO2017/183423
PCT Pub. Date: Oct. 26, 2017

(65) Prior Publication Data
US 2019/0128505 A1 May 2, 2019

(30) Foreign Application Priority Data
Apr. 21, 2016 (JP) .................................. 2016-085011

(51) Int. Cl.
*F21V 9/14* (2006.01)
*F21V 11/16* (2006.01)
*G02B 5/30* (2006.01)

(52) U.S. Cl.
CPC ............... *F21V 9/14* (2013.01); *F21V 11/16* (2013.01); *G02B 5/3058* (2013.01)

(58) Field of Classification Search
CPC ......... F21V 9/14; F21V 11/16; G02B 5/3058; G02B 5/30; G09F 13/04
See application file for complete search history.

(56) References Cited

U.S. PATENT DOCUMENTS

| 2,165,974 A * | 7/1939 | Land ....................... G09F 19/18 359/486.02 |
| 6,375,870 B1 * | 4/2002 | Visovsky ............... B82Y 10/00 216/24 |

(Continued)

FOREIGN PATENT DOCUMENTS

| JP | 61-25002 Y2 | 7/1986 | |
| JP | 2013156620 A * | 8/2013 | ........... G02B 5/3083 |
| KR | 1020170072426 A * | 6/2017 | ........... G02B 27/281 |

OTHER PUBLICATIONS

Machine English Translation of KR1020170072426; Kim; (Year: 2017).*

(Continued)

*Primary Examiner* — Anh T Mai
*Assistant Examiner* — Glenn D Zimmerman
(74) *Attorney, Agent, or Firm* — Roberts Mlotkowsi Safran Cole & Calderon P.C.

(57) ABSTRACT

A display device includes board with a display region, and a light source that emits an illumination light having a polarization direction along a direction of a first absorption axis or a direction of a second absorption axis perpendicular to the first absorption axis. The display region includes a first region including a region polarization-microfabricated in the direction of the first absorption axis, a second absorption axis, and a third region that transmits the light. Only the first region and the third region are displayed on the display board by emitting the light having a polarization direction along the direction of the second absorption axis. Only the second region and the third region are displayed on the display board by the emitting the light having a polarization direction along the direction of the first absorption axis.

9 Claims, 3 Drawing Sheets

(56) References Cited

U.S. PATENT DOCUMENTS

| | | | |
|---|---|---|---|
| 2006/0038309 A1* | 2/2006 | Korenaga | B29C 43/021 264/2.7 |
| 2013/0127897 A1* | 5/2013 | Baker | G09F 9/46 345/593 |
| 2017/0176761 A1* | 6/2017 | Kim | G02B 27/281 |

OTHER PUBLICATIONS

International Preliminary Report on Patentability issued in corresponding International Application No. PCT/JP2017/013656 dated Nov. 1, 2018.

International Search Report and Written Opinion issued in corresponding International Application No. PCT/JP2017/013656 dated Jun. 6, 2017.

* cited by examiner

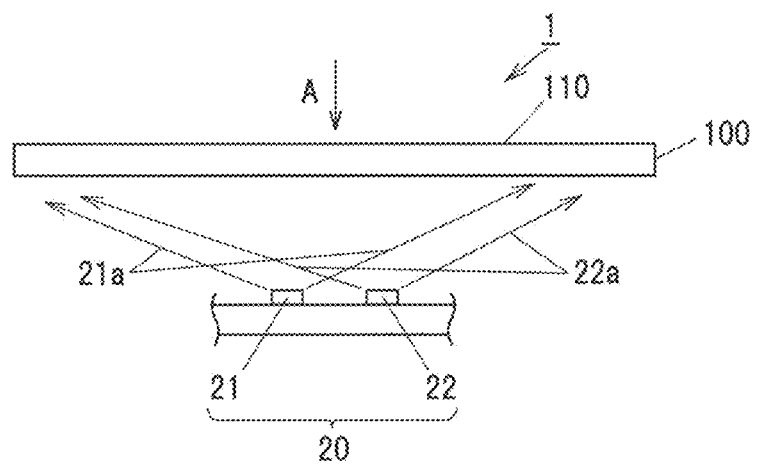
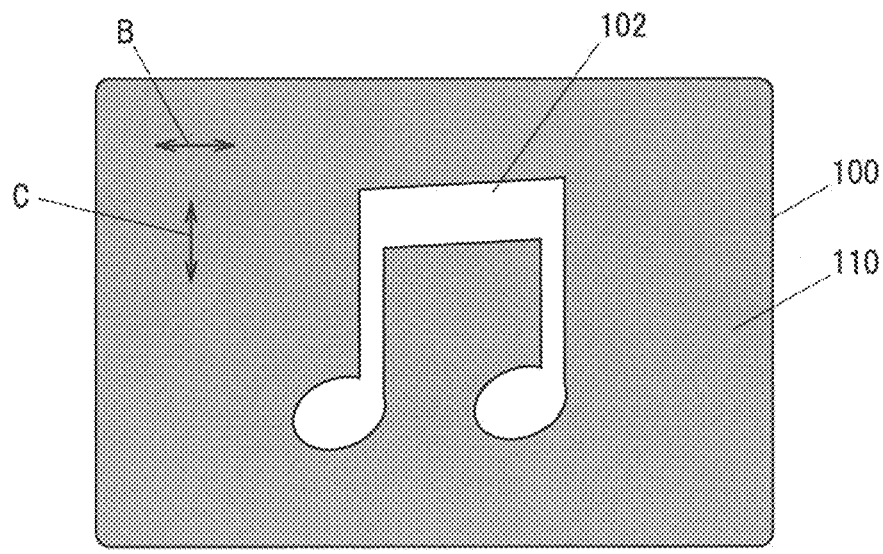
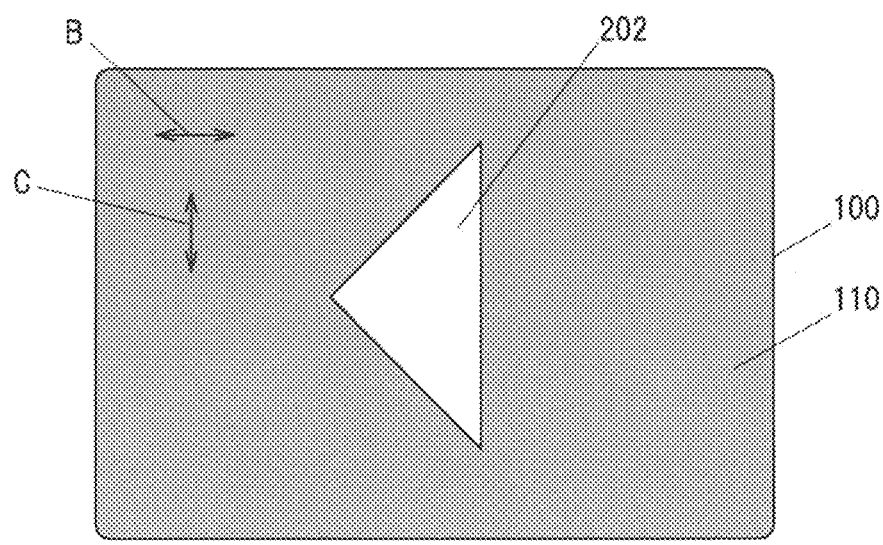

DISPLAY DEVICE AND METHOD FOR MANUFACTURING DISPLAY BOARD

CROSS-REFERENCE TO RELATED APPLICATIONS

The present application is a U.S. National Phase of PCT/JP2017/013656 filed on Mar. 31, 2017 claiming priority to Japanese Patent Application No. 2016-085011 filed on Apr. 21, 2016. The disclosure of the PCT Application is hereby incorporated by reference into the present Application.

TECHNICAL FIELD

The present invention relates to a display device and a method for manufacturing a display board.

BACKGROUND ART

A display device switchably displaying different shapes, etc., on the same display surface is known (see, e.g., Japanese Examined Utility Model Application Publication No. 61/25002). This display device is composed of two light sources, two light source-polarizing panels respectively provided in front of the light sources and having polarization directions perpendicular to each other, and two display-polarizing panels which are overlapped and provided in front of the light source-polarizing panels and have polarization directions perpendicular to each other and each of which has a light transmitting portion formed by cutting out a shape or a letter/character to be displayed. The device is configured as a display switching lamp which switches the display by switching a turned-on light source between the two light sources.

Since the display device disclosed in Japanese Examined Utility Model Application Publication No. 61/25002 switchably displays different shapes, etc., on the same display surface, the display surface requires only a small space and clear display is obtained with a simpler configuration than the conventional display switching lamp used for the same purpose.

CITATION LIST

Patent Literature

Japanese Examined Utility Model Application Publication No. 61/25002

SUMMARY OF INVENTION

Technical Problem

The display device of Japanese Examined Utility Model Application Publication No. 61/25002 requires two light source-polarizing panels respectively provided in front of the light sources and having polarization directions perpendicular to each other. In addition, since the light transmitting portion is formed on the display-polarizing panel by cutting out a shape or a letter/character to be displayed, there is a problem that transmittance is different between the cut-out portion and the non-cut out portion, which affects the contrast of the displayed shape or letter/character and causes a decrease in display performance.

It is an object of the invention to provide a display device capable of switching display using one display board by means of polarization, and a method for manufacturing a display board.

Solution to Problem

A display device in an embodiment of the invention comprises: a display board with a display region that comprises a plurality of regions each having a different polarization direction due to the difference in absorption axis direction; and a light source that emits an illumination light having a polarization direction along a direction of a first absorption axis or along a direction of a second absorption axis perpendicular to the first absorption axis, wherein the display region comprises a first region comprising a region polarization-microfabricated in the direction of the first absorption axis, a second region comprising a region polarization-microfabricated in the direction of the second absorption axis, and a third region that transmits the illumination light, wherein only the first region and the third region are displayed on the display board by emitting the illumination light having a polarization direction along the direction of the second absorption axis, and wherein only the second region and the third region are displayed on the display board by emitting the illumination light having a polarization direction along the direction of the first absorption axis.

[2] The display device according to [1] may be such that display produced by the first and third region and display produced by the second and third regions overlap in the third region on the display board.

[3] The display device according to [1] or [2] may be such that a region other than the first to third regions comprises a light shielding portion that does not transmit the illumination light.

[4] A method for manufacturing a display board in another embodiment of the invention comprises: a substrate-preparing step for preparing a substrate; and a polarization microfabricating step for polarization-microfabricating a first region of the substrate to impart a polarizing function of polarizing light in a direction of a first absorption axis and microfabricating a second region of the substrate to provide a polarization function in a direction of a second absorption axis.

[5] The display device according to [1] may be such that the display board comprises a glass substrate and a metal layer formed on the glass substrate, and the metal layer is polarization-microfabricated in a thickness direction thereof

[6] The display device according to [1] may be such that the light source comprises a first light source with a polarization direction parallel to the direction of the second absorption axis, and a second light source with a polarization direction parallel to the direction of the first absorption axis.

Advantageous Effects of Invention

According to an embodiment of the invention, it is possible to provide a display device capable of switching display using one display board by means of polarization.

BRIEF DESCRIPTION OF DRAWINGS

FIG. 1A is an explanatory diagram illustrating a configuration of a display device in an embodiment of the present invention.

FIG. 1B is an explanatory diagram illustrating a state in which a musical note symbol is displayed on a display unit when viewing the display device in an A direction.

FIG. 1C is an explanatory diagram illustrating a state in which an arrow symbol is displayed on the display unit when viewing the display device in the A direction.

DESCRIPTION OF EMBODIMENT (Configuration of a Display Device 1 in an Embodiment of the Invention)

Figure 2:
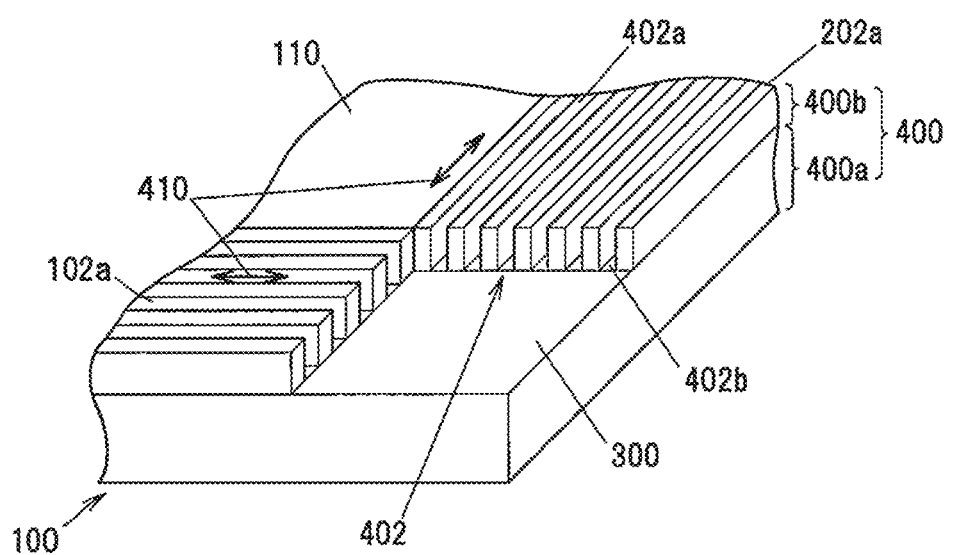
FIG. 2 is a perspective view showing a portion of the display board polarization-microfabricated.
Figure 3A:
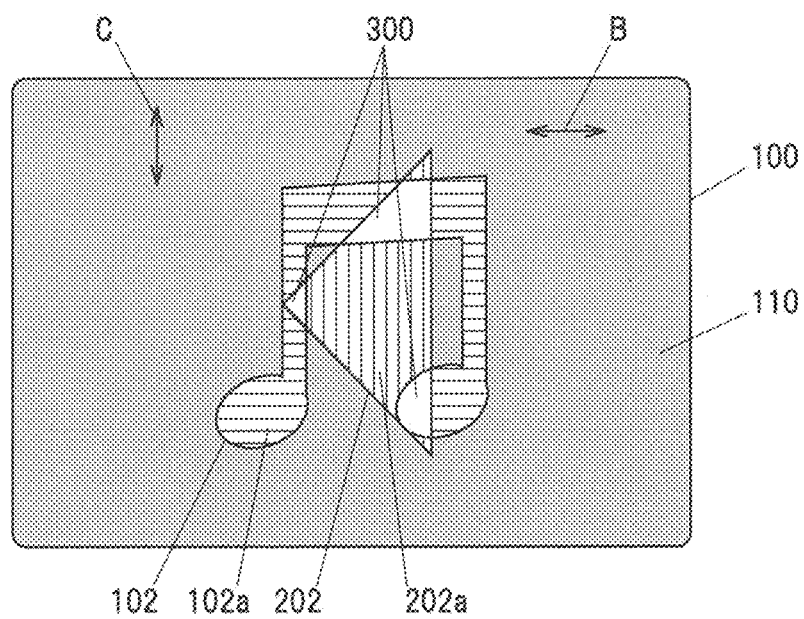
FIG. 3A is a plan view showing the display board.
Figure 3B:
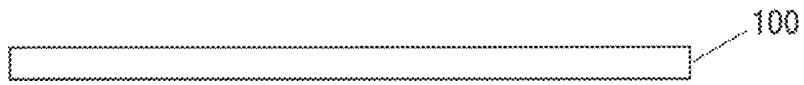
FIG. 3B is a side view showing the display board.

FIG. 1A is an explanatory diagram illustrating a configuration of a display device in an embodiment of the invention, FIG. 1B is an explanatory diagram illustrating a state in which a musical note symbol is displayed on a display unit when viewing the display device in an A direction, and FIG. 1C is an explanatory diagram illustrating a state in which an arrow symbol is displayed on the display unit when viewing the display device in the A direction. FIG. 2 is a perspective view showing a portion of the display board polarization-microfabricated. FIG. 3A is a plan view showing the display board and FIG. 3B is a side view showing the display board. The configuration of a display device 1 in an embodiment of the invention will be described below based on these drawings.

As shown in FIGS. 1A to 1C, the display device 1 in the embodiment of the invention has a display board 100 with a display region consisting of plural regions each having a different polarization direction due to the difference in absorption axis direction, and a light source 20 which emits illumination light (polarized light) having a polarization direction along a direction of a first absorption axis B or along a direction of a second absorption axis C perpendicular to the first absorption axis B, wherein the display region is composed of a first region 102a having a region polarization-microfabricated in the direction of the first absorption axis B, a second region 202a having a region polarization-microfabricated in the direction of the second absorption axis C, and an overlap region 300 as a third region which transmits the illumination light, only the first region 102a and the overlap region 300 as the third region are displayed on the display board 100 by emitting the illumination light (polarized light) having a polarization direction along the direction of the second absorption axis C, and only the second region 202a and the overlap region 300 as the third region are displayed on the display board 100 by emitting the illumination light (polarized light) having a polarization direction along the direction of the first absorption axis B.

A light shielding portion 110 which does not transmit the illumination light or has a small transmittance is provided in the region other than the first to third regions, i.e., the region other than the first region 102a, second region 202a and the overlap region 300 as the third region. The light shielding portion 110 has a light shielding film for shielding illumination light both in the first absorption axis direction and of the second absorption axis direction and produces display contrast during an operation of displaying a mark section.

(Light Source 20)

Light emitted from the light source 20 (a first light source 21 and a second light source 22) can be, e.g., laser light or LED light, etc. When light emitted from the light source 20 (the first light source 21 and the second light source 22) is, e.g., laser light, a polarization direction is adjusted so that light has a polarized component in a specific direction. In case of LED light, etc., a polarizing element is arranged at a light output portion so that light has a polarized component in a specific direction. As shown in FIG. 1A, the light source 20 consists of the first light source 21 with a polarization direction along a direction of the second absorption axis of the display board 100 (the arrow C direction) and the second light source 22 with a polarization direction along a direction of the first absorption axis of the display board 100 (the arrow B direction). First illumination light 21a is emitted from the first light source 21 toward the display board 100, and second illumination light 22a is emitted from the second light source 22 toward the display board 100.

When the light source 20 is a source of elliptically polarized light or circularly polarized light, the illumination configuration may be such that, e.g., a polarizing element relatively rotatable about a light axis is arranged at the light output portion of the light source 20, and the light source 20 and the polarizing element are rotated so that the first illumination light 21a with a polarization direction along the direction of the second absorption axis of the display board 100 (the arrow C direction) and the second illumination light 22a with a polarization direction along the direction of the first absorption axis of the display board 100 (the arrow B direction) are produced and illumination light is emitted toward the display board 100.

(Display Board 100)

As shown in FIG. 2, the display board 100 is formed of a substrate 400 composed of a glass substrate 400a and a metal layer 400b (e.g., Cr, Al) formed thereon, and is configured that a display region has plural regions formed by polarization-microfabricating the metal layer 400b in the thickness direction thereof. The plural regions have different absorption axes and thus have different polarization directions.

The metal layer 400b is partially removed by the polarization microfabricating so that peak portions 402a and valley portions 402b are alternately arranged and blade portions 402 are thereby formed at predetermined intervals. The extending direction of the blade portion 402 is an absorption axis 410. That is, light containing a polarized component parallel to the absorption axis 410 is absorbed, and light containing polarized component perpendicular to the absorption axis 410 is transmitted. Thus, the regions polarization-microfabricated have a polarizing function.

(Mark Section)

A note-mark section 102 on the display board 100 shown in FIG. 1A is composed of the first region 102a and the overlap region 300 as the third region shown in FIG. 3A. Meanwhile, an arrow-mark section 202 is composed of the second region 202a and the overlap region 300 as the third region shown in FIG. 3A.

The first region 102a of the -mark section 102 is formed so that the absorption axis 410 of the blade portion 402 shown in FIG. 2 is along a direction of the first absorption axis (the arrow B direction), as shown in FIG. 3A. Therefore, the first region 102a transmits polarized light output from the first light source 21 and containing a polarized component parallel to a direction of the second absorption axis (the arrow C direction), but does not transmit polarized light output from the second light source 22 and containing a polarized component parallel to the direction of the first absorption axis (the arrow B direction).

The second region 202a of the arrow-mark section 202 is formed so that the absorption axis 410 of the blade portion 402 shown in FIG. 2 is along the direction of the second absorption axis (the arrow C direction), as shown in FIG. 3A. Therefore, the second region 202a transmits polarized light output from the second light source 22 and containing a polarized component parallel to the direction of the first absorption axis (the arrow B direction), but does not transmit polarized light output from the first light source 21 and containing a polarized component parallel to the direction of the second absorption axis (the arrow C direction).

The overlap region 300 as the third region is a portion shared by the note-mark section 102 and the arrow-mark section 202. The overlap region 300 transmits illumination light regardless of the polarization state of the illumination light. The overlap region 300 is configured so that transmittance of the illumination light therethrough is substantially the same as transmittance of the illumination light through the first region 102a or the second region 202a. The overlap region 300 having such predetermined transmittance can be formed by removing the metal layer 400b to a predetermined depth shown in FIG. 2 without forming the blade portions when polarization-microfabricating the overlap region 300.

The light shielding portion 110 is a non-processed portion in which the metal layer 400b is not processed. The light shielding portion 110 is formed, e.g., on a surface of the display board 100 in the region other than the first region 102a, the second region 202a and the overlap region 300 as the third region. The light shielding portion 110 shields illumination light both in the first absorption axis direction and of the second absorption axis direction. Thus, the mark section can be displayed with good contrast during the operation of displaying the mark section.

(Display Operation of the Display Device 1)

(Where the Note-Mark Section 102 is Displayed on the Display Board 100)

In the display device 1 shown in FIG. 1A, the first light source 21 is turned on and the second light source 22 is turned off. The display board 100 is illuminated only by the first light source 21 with a polarization direction parallel to the direction of the second absorption axis of the display board 100 (the arrow C direction). The first region 102a of the note-mark section 102 transmits polarized light output from the first light source 21 and having a polarization direction parallel to the direction of the second absorption axis (the arrow C direction) but does not transmit polarized light output from the second light source 22 and having a polarization direction parallel to the direction of the first absorption axis (the arrow B direction) since the blade portions 402 are formed to extend parallel to the direction of the first absorption axis (the arrow B direction). Therefore, the first illumination light 21a is transmitted through the first region 102a. The first illumination light 21a is also transmitted through the overlap region 300 as the third region. On the other hand, the first illumination light 21a is not transmitted through the light shielding portion 110 and the second region 202a. Thus, only the note-mark section 102 is displayed on the display board 100 and the other portion is not displayed, as shown in FIG. 1B.

(Where the Arrow-mark Section 202 is Displayed on the Display Board 100)

In the display device 1 shown in FIG. 1A, the second light source 22 is turned on and the first light source 21 is turned off. The display board 100 is illuminated only by the second light source 22 with a polarization direction parallel to the direction of the first absorption axis of the display board 100 (the arrow B direction). The second region 202a of the arrow-mark section 202 transmits polarized light output from the second light source 22 and having a polarization direction parallel to the direction of the first absorption axis (the arrow B direction) but does not transmit polarized light output from the first light source 21 and having a polarization direction parallel to the direction of the second absorption axis (the arrow C direction) since the blade portions 402 are formed to extend parallel to the direction of the second absorption axis (the arrow C direction). Therefore, the second illumination light 22a is transmitted through the second region 202a. The second illumination light 22a is also transmitted through the overlap region 300 as the third region. On the other hand, the second illumination light 22a is not transmitted through the light shielding portion 110 and the first region 102a. Thus, only the arrow-mark section 202 is displayed on the display board 100 and the other portion is not displayed, as shown in FIG. 1C.

(Method for Manufacturing the Display Board 100)

The display board 100 is formed by a substrate-preparing step for preparing the substrate 400 and a polarization microfabricating step for polarization-microfabricating the first region 102a of the substrate 400 to provide a polarization function in the direction of the first absorption axis (the arrow B direction) and also microfabricating the second region 202a of the substrate 400 to provide a polarization function in the direction of the second absorption axis (the arrow C direction). The polarization microfabricating steps are simultaneously conducted as described below, but the polarization microfabricating step for the first region 102a and the polarization microfabricating step for the second region 202a may be conducted in separate steps.

The overlap region 300 as the third region may be formed by a third processing step in which the polarization microfabricating is performed so that the metal layer 400b is removed to a predetermined depth without forming the blade portions. Alternatively, the substrate can be directly used without the processing.

The polarization microfabricating is performed by an electron-beam lithography system or photolithography etc. Where the polarization microfabricating is performed by the electron-beam lithography system or photolithography etc., the glass substrate 400a and the metal layer 400b can be microfabricated in the order of nanometers (e.g., about 50 nm). In the present embodiment, the electron-beam lithography system is used.

The electron-beam lithography system (electron beam (EB) exposure system) is based on electron beam processing system and scanning electron microscope. An electron beam emitted from an electron gun is focused on a mask blank through an electron lens, aperture or deflector, etc., while finely controlling a XYZ stage, thereby exposing the substrate 400 to light in a desired pattern. In the present embodiment, the metal layer 400b (e.g., Cr, Al) is formed on the glass substrate 400a and a resist layer is then formed thereon. The resist layer is processed into a predetermined pattern by the electron-beam lithography system, and the metal layer 400b is then removed using the remaining resist layer as a mask. As a result, the blade portions are formed and the polarizing function is imparted. In the present embodiment, this pattern is configured as a pattern for forming the blade portions of the first region 102a and the second region 202a so that polarizing function is imparted. In these steps, the first region 102a, the second region 202a, the overlap region 300 and the light shielding portion 110 are formed simultaneously.

(Effects of the Embodiment of the Invention)

The display device and the manufacturing method in the present embodiment exert the following effects.

(1) The display device in the present embodiment has a display board 100 with a display region consisting of plural regions each having a different polarization direction due to the difference in absorption axis direction, and a light source 20 which emits illumination light (polarized light) having a polarization direction along a direction of a first absorption axis B or along a direction of a second absorption axis C perpendicular to the first absorption axis B, wherein the display region is composed of a first region 102a having a region polarization-microfabricated in the direction of the first absorption axis B, a second region 202a having a region polarization-microfabricated in the direction of the second absorption axis C, and an overlap region 300 as the third region which transmits the illumination light, only the first region 102a and the overlap region 300 as the third region are displayed on the display board 100 by emitting the illumination light (polarized light) having a polarization direction along the direction of the second absorption axis C, and only the second region 202a and the overlap region 300 as the third region are displayed on the display board 100 by emitting the illumination light (polarized light) having a polarization direction along the direction of first absorption axis B. In this configuration, it is possible to switch display by emitting illumination light in a different polarization state from the first light source 21 or the second light source 22 onto one display board 100. Display can be switched in the same color, e.g., switched from white to white.

(2) As such, display can be switched from white to white by using one display board 100. When applied to, e.g., a steering wheel switch of vehicle, it is possible to double the switching function.

(3) Examples of advantages of switching display in the same color such as white-to-white display are: for example, the structure is simpler and the cost is lower than a display; usually two iodine-based or dye-based polarizing panels are required but the present embodiment can be implemented by using only one such polarizing panel; the iodine-based or dye-based polarizing panel is usually weak but the polarizing panel in the present embodiment has excellent strength; and the display board 100 in the present embodiment is formed of an inorganic material and is thus strong and stable against environmental changes.

(4) In the conventional technique, since the light transmitting portion is formed on the display-polarizing panel by cutting out a shape or a letter/character to be displayed, transmittance is different between the cut-out portion and the non-cut out portion, which affects the contrast of the displayed shape or letter/character and causes a decrease in display performance. In contrast, in the display device of the present embodiment, the first region 102a, the second region 202a and the overlap region 300 as the third region of the display board 100 can have substantially the same transmittance. Therefore, it is possible to realize a display device which can display the mark section with high quality and has excellent display performance.

Although some embodiments of the invention have been described above, the embodiments are merely an example and the invention according to claims is not to be limited thereto. These new embodiments may be implemented in various other forms, and various omissions, substitutions and changes, etc., can be made without departing from the gist of the invention. In addition, all combinations of the features described in the embodiments are not necessary to solve the problem of the invention. Further, these embodiments are included within the scope and gist of the invention and also within the invention described in the claims and the equivalency thereof.

REFERENCE SIGNS LIST

1 DISPLAY DEVICE
20 LIGHT SOURCE
21 FIRST LIGHT SOURCE
21a FIRST ILLUMINATION LIGHT
22 SECOND LIGHT SOURCE
22a SECOND ILLUMINATION LIGHT
100 DISPLAY BOARD
110 LIGHT SHIELDING PORTION
102a FIRST REGION
202a SECOND REGION
300 OVERLAP REGION
400 SUBSTRATE
400a GLASS SUBSTRATE
400b METAL LAYER

The invention claimed is:

1. A display device, comprising:
a display board comprising a display region that comprises a plurality of regions each having a different polarization direction due to a difference in absorption axis direction; and
a light source that emits an illumination light having a polarization direction along a direction of a first absorption axis or along a direction of a second absorption axis perpendicular to the first absorption axis,
wherein the display region comprises a first region comprising a region polarization-microfabricated in the direction of the first absorption axis, a second region comprising a region polarization-microfabricated in the direction of the second absorption axis, and a third region that transmits the illumination light,
wherein only the first region and the third region are displayed on the display board by emitting the illumination light having a polarization direction along the direction of the second absorption axis,
wherein only the second region and the third region are displayed on the display board by emitting the illumination light having a polarization direction along the direction of the first absorption axis, and
wherein the display board comprises a single substrate on a surface of which the first to third regions are directly formed.

2. The display device according to claim 1, wherein display produced by the first and third region and display produced by the second and third regions overlap in the third region on the display board.

3. The display device according to claim 1, wherein a region other than the first to third regions comprises a light shielding portion that does not transmit the illumination light.

4. The display device according to claim 1, wherein the light source comprises a first light source with a polarization direction parallel to the direction of the second absorption axis, and a second light source with a polarization direction parallel to the direction of the first absorption axis.

5. The display device according to claim 2, wherein a region other than the first to third regions comprises a light shielding portion that does not transmit the illumination light.

6. A method for manufacturing a display board, comprising:
preparing a single substrate; and
polarization-microfabricating a first region of the substrate to provide a polarizing function in a direction of a first absorption axis and for polarization-microfabricating a second region of the substrate to provide the polarization function in a direction of a second absorption axis perpendicular to the first absorption axis,
wherein the first and second regions are directly formed on a surface of the single substrate.

7. The display device according to claim 1, wherein the display board comprises a glass substrate and a metal layer formed on the glass substrate, and the metal layer is polarization-microfabricated in a thickness direction thereof.

8. The method according to claim 6, wherein the polarization microfabricating comprises fabricating a third region where no blade for an absorption axis is formed.

9. The method according to claim 8, wherein the third region is fabricated as an overlap of the first and second regions.

* * * * *